United States Patent [19]

Ayusawa et al.

[11] 4,077,098

[45] Mar. 7, 1978

[54] APPARATUS FOR MANUFACTURING A METALLIC TUBE COATED WITH A THERMOPLASTIC RESIN FILM HAVING LITTLE RESIDUAL STRAIN

[75] Inventors: Saburo Ayusawa; Mansei Tanaka, both of Kimitsu, Japan

[73] Assignee: Nippon Steel Corporation, Tokyo, Japan

[21] Appl. No.: 565,364

[22] Filed: Apr. 7, 1975

[51] Int. Cl.² .................. B05D 1/26; B05D 3/00; B21C 37/06
[52] U.S. Cl. ..................... 29/33 T; 118/69; 425/445; 427/374 A
[58] Field of Search ............... 29/33 D, 33 T; 118/69; 427/374 R, 374 A, 318; 425/404, 445

[56] References Cited

U.S. PATENT DOCUMENTS 3,068,119  12/1962  Gotsch .................. 427/374 R X
3,581,922  6/1971  Versoy et al. ............ 427/318 X

Primary Examiner—Z. R. Bilinsky
Attorney, Agent, or Firm—Burgess, Dinklage & Sprung

[57] ABSTRACT

A steel pipe is coated with resin at high temperature. After the temperature is lowered slightly below the softening point of the resin, the coated pipe is cut to length and then allowed to be cooled down to an ordinary temperature, meanwhile the resin is freely shrunk, leaving little residual strain in the cooled product coating.

A cooling means for cooling the coating from the middle toward the ends in its longitudinal direction and a means for cooling the coating forcibly are provided.

6 Claims, 8 Drawing Figures

APPARATUS FOR MANUFACTURING A METALLIC TUBE COATED WITH A THERMOPLASTIC RESIN FILM HAVING LITTLE RESIDUAL STRAIN

DETAILED DESCRIPTION OF THE INVENTION

This invention relates to a method and apparatus for manufacturing a metallic tube coated with a thermoplastic resin film having little residual strain.

Examples for manufacturing a coated steel pipe which have conventionally been practiced are described hereinafter in comparison with those of this invention with respect to drawings.

Figure 1:
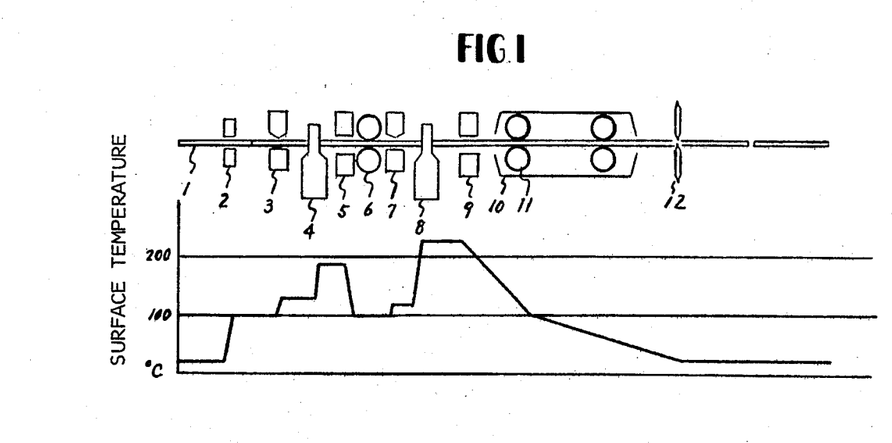
FIG. 1 is a schematic view showing an example of a line for manufacturing a resin coated pipe with temperature curve according to the conventional method.

In FIG. 1 showing the conventional method, the numeral 1 is a steel pipe. It is preheated by a preheating means 2, connected by suitable joint means with each other, and subject to undercoating with asphalt, synthetic rubber, resin, etc. at 3. The numeral 4 is an extrusion machine, whereby the first layer coating for anticorrosion layer is conducted. For this first layer or anti-corrosion layer, a thermoplastic resin such as polypropylene, low density polyethylene, high density polyethylene, etc., particularly one showing good anti-stress, anti-corrosion cracking property. After the steel pipe is coated with such molten cylindrical plastic extruded from a round die, the outer surface of the coated steel pipe is cooled by air, or water, etc. at a cooling unit 5. This is intended to prevent scar on the coating when it is passed through pinch rolls or other transporting means. After passed through the pinch rolls 6, the coated steel pipe is subjected to coating with an agent for preventing melt-adhesion at 7. It is intended to prevent the melt-adhesion of the first layer resin and the second layer resin, for which poly-butene or silicone, etc. is used. The numeral 8 is another extrusion machine whereby the second protective layer is coated. The material used for this second layer is a thermoplastic resin such as polypropylene, low density polyethylene, high density polyethylene, etc., particularly one having large mechanical strength.

After the second layer is coated, the coated steel pipe is cooled uniformly by spraying a compressed air on the outer surface of the coating in a cooling apparatus 9. It is intended to prevent any possible spots appearing on the surface of the coating due to non-uniform cooling caused by scattering of water drops from a water cooling device. Then in a cooling device 10, the coated pipe is cooled down by water to a temperature at which there is no scar given by transportation rolls on the surface of the coating. Thereafter the pipe is cooled down to an ordinary temperature in an apparatus subsequent to the cooling device 10.

Then the coated pipe is cut at its joint positions by a flying shear 12 to its original length.

When the thermoplastic resin is extruded from the round die, the inside diameter and the thickness of the molten cylindrical body of the resin just excluded out of the lip of the die are usually larger than the outside diameter of the steel pipe to be coated and the thickness of the coated film. Thus, the velocity of the steel pipe is made larger than the extrusion velocity of the resin, whereby the molten cylindrical resin tends to be stretched so that the inside diameter and the thickness thereof may be made small and the resin intimately adheres to the outer surface of the steel pipe. The ratio of the sectional area of the molten cylindrical body to the sectional area of the film coated on the steel pipe is defined as the drop ratio, which has the optimum value for the specific thermoplatic resin used. For example, the optimum value of the drop ratio is 1.5 for the low density polyethylene, 1.2 for the high density polyethylene, 4.0 for the nylon and 1.5 for the vinyl chloride. If the ratio becomes too large, the surface of the coating may become coarse, or an internal strain may remain inside the coating. If the ratio becomes too small, the quality of the product is good, but the back pressure at the die may become large, which makes it necessary to increase the pressure resisting strength, incurring difficulty in equipments. Accordingly, it is a common practice to determine the drop ratio by taking into account the quality of the coated steel pipe and the capacity of the extrusion machine and die. In case of using polyethylene, for example, the coating is effected at the drop ratio of 1.2 to 6.0 in a usual operation. In this case, the drop ratio must be made large at most times, which will thus cause a great deal of internal strains remaining in the coating. As a result, in the conventional process wherein the steel pipe is cut after the resin is coated and cooled completely down to an ordinary temperature, a serious problem as arisen which is explained as follows:

In the conventional process, the coating is completely continuous from a resin extrusion machine to a cutter and during this process a cooling step exists to rapidly cool the surface of the coated steel pipe to an ordinary temperature. It means that the surface of the resinous coating which sequentially arrives at the cutter has already been cooled down to an ordinary temperature.

Taking one steel pipe product of a predetermined length as an example, at the time when its fore end is cut, at least the coating on or near the fore end has already reached to an ordinary temperature, has substantially sticked to the steel pipe, whereby the contraction or shrinkage of the coating is restricted.

On the other hand, the rear end of the pipe is quite continuous from an extrusion machine through a cooling step and is similarly restricted. When the rear end reaches a cutter, it has already been cooled down to an ordinary temperature, of course. In this way, the coating is temporarily fixed to the pipe, leaving therein a residual strain. It is because an internal strain has not been released in the coating. Due to this residual strain, the coated steel pipe product cut to a predetermined length will expose the base metal part at the end of the pipe in the course of time because of contraction or shrinkage of the coated part. For example, in case that a coated steel pipe cut to a length of 5.5 m is stored outdoors in summer, it often happens that the coating shrinks by about 30 mm in one month after manufacture. It is, of course, harmful to the quality of product in view of anti-corrosion property.

It has thus heretofore been proposed as a counter measure to provide a coated steel pipe product having somewhat longer cut length after cooled; storing the same for several days until an initial shrinkage of the coating is completed and a part of the residual strain is considered to have been released; and then conducting a trimming operation to cut off the ends of the pipe to a predetermined length.

Figure 4:
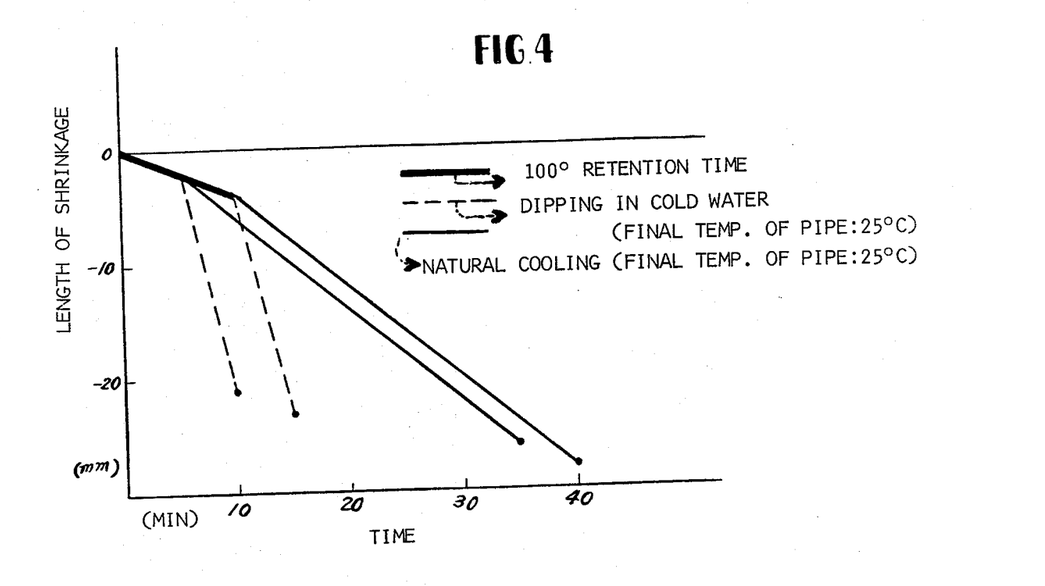
FIG. 4 is a schematic view showing another example for manufacturing a resin coated pipe according to the conventional method.

This is further explained by another example with respect to FIG. 4. In FIG. 4, a steel pipe having both ends threaded by a threading machine 21 is passed to a cleaning step 22 where the pipe is subjected to degreasing, pickling or water-washing so as to continuously effecting degreasing and anti-corrosion treatment upon the interior and exterior surfaces of the steel pipe, followed by a drying step by hot blast to remove the water attached to the internal and external surfaces of the steel pipe. Thereafter, the steel pipe is passed to a painting step 34 where the internal surface of the pipe is painted by an interior-surface painting machine, and subsequently passed to a baking machine 24 where setting and drying are conducted.

The metallic pipe having its internal surface thus painted is then passed to a coating step where the resin is continuously coated on the external surface of the pipe. For this, a joint means capable of freely connecting or separating pipes is inserted by means of an inserting machine 25 into the rear end of a preceeding metallic pipe and the fore end of a susequent metallic pipe. Thus the two pipes are connected into one, and transported in its axial direction. Then an undercoating agent which serves to assist intimate adhesion of the resinous coating and the surface of the pipe as well as to exert anti-corrosion action is applied to the outer surface of the metallic pipe by means of a painting machine 26. As for the undercoating agent, an adhesive of a hot-melt type consisting of asphalt, synthetic rubber, synthetic resin, etc. is often used. Alternatively, modified polyethylene, copolymer of ethylene and vinyl acetate, etc. may be used as extrusion coating or powder coating.

Then a thermoplastic resin such as polyethylene, polypropylene, etc. is discharged from a cross head die of the first extrusion machine 27 in a cylindrical form, and coated on the surface of the metallic pipe. Usually, the resin coating layer is one layer, but the pipe coated with two layers by coating another layer on the original layer may be manufactured as the case may require. In that case, after the first resin is coated by the extrusion machine 27, an agent for preventing melt-adhesion such as paraffin, poly-butene, silicone is applied, and the second resin is applied thereon as the second layer by means of the second extrusion machine 27'.

The metallic pipe, the outer surface of which has been coated with the resin in the above manner, is then subjected to air-cooling and water-cooling by means of a cooling means 28 to an ordinary temperature. Then after that, the above mentioned joint means is cut together with the coating by means of a flying shear 29 to the original length.

Then the pipe cut to the original length is once allowed to stand in a storage space 23, and then passed to a pipe-end trimming step where the end of the coating is cut off at a position apart from the edge of the pipe by a predetermined distance by means of a trimming machine 30. Then sockets or caps are applied to both ends of the pipe by an inserting apparatus 31, which pipe is then packed by automaic packing machine 32 and shipped out.

As set forth above, it takes several days before the product is obtained, which can not meet urgent demands and thus causes enormous loses and troubles.

In addition, as also shown in this example, the screw in the pipe is threaded in the initial step of the conventional process, which gives rise to a disadvantage as follows.

That is, it is impossible to prevent scars imparted to the threaded part or the screw of the pipe, which scars are caused by skid, roll-gang or other transporting means or by mutual contact of the metallic pipes per se in the steps subsequent to the threating step.

If it is intended to prevent scars imparted to the screw, it is inevitable to provide special device to the transporting means or to cover both ends of the metallic pipe with protecting caps. If such caps are to be used, an automatic cap applying means becomes necessary, which incurs not only increased cost for equipment but also increased cost for consumption of the caps.

Moreover, after the resin is coated on the external surface of the metallic pipe, the screw of the threaded part is exposed in a trimming step, which requires removal of the resin coated on the threaded part. In this case, if the undercoating agent has been sticked to the threaded part, the removal of the resin becomes difficult. Even if the resin can be removed, the dirty threaded part due to the undercoating agent sticking thereto has an adverse effect upon the quality of the product.

Accordingly, it becomes necessary to cover the threaded port with the protecting cap or to apply an agent capable of easily removing such undercoating agent, if sticked, which results in such disadvantages as complicate steps or high costs.

Figure 3:
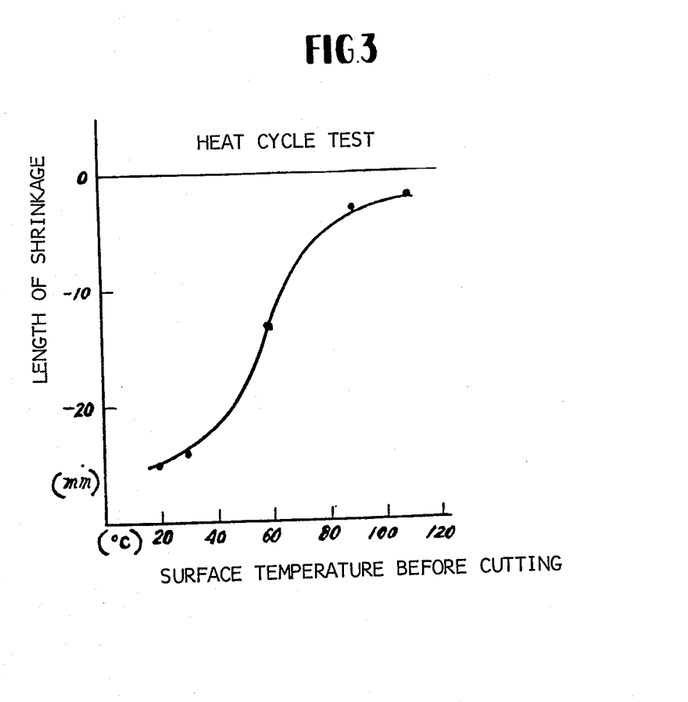
FIG. 3 is a graph showing a relation of temperature and shrinkage.

The inventors of this invention have now found that, by improving the process of cooling step, the residual strain can effectively be released and the shrinkage of the coating due to the lapse of time can be lessened, which is demonstrated by the following experiments:

The degree of remaining of the internal strain has co-relation with the length of shrinkage of the coating in several months after manufacture of the coated steel pipe. This co-relation can be presumed by a heat-cycle test for a short time in which heating and cooling are given to the test sample. In one example, a high density polyethylene-coated steel pipe having a 0.3 mm undercoating, a 0.5 mm first layer and a 1.0 mm second layer is cut to a length of 5.5 mm. The temperature of the external surface and the degree of remaining of the internal strain are tested according to a heat cycle of immersion in a hot water bath at 90° C for 10 minutes, followed by water cooling. The result of the test is shown in FIG. 3.

If the pipe is cut at an ordinary temperature, the length of shrinkage of the coating is largest because of large residual strain. As the temperature at cutting is elevated, the length of shrinkage becomes smaller, from which it can be considered that the internal strain becomes smaller accordingly. At or near the temperature of 110° C which is in the vicinity of the softening temperature or 128° C of the high density polyethylene used, the influence of the temperature is quite small, which becomes further smaller as the temperature is increased.

Figure 2:
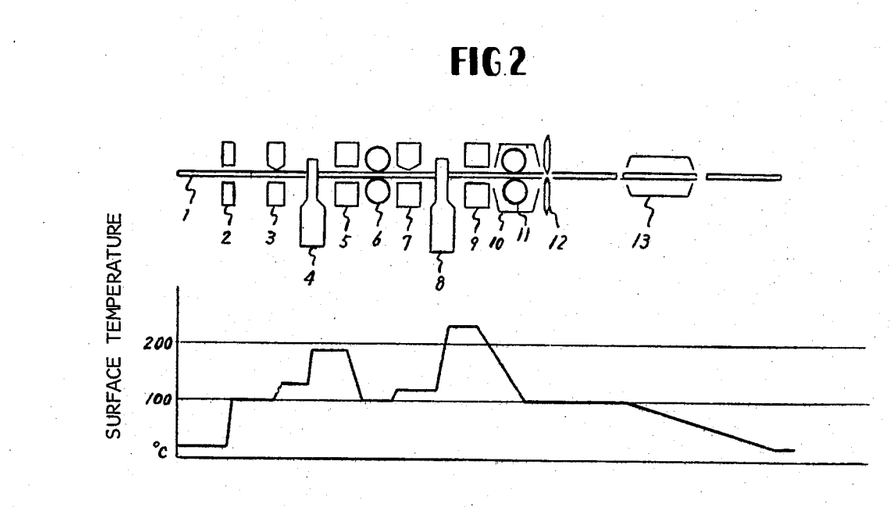
FIG. 2 is a schematic view showing an example of a line for manufacturing a resin coated pipe with temperature curve according to the method of this invention.

Based upon the above results, the cooling by the cooling means 10 to be effected after the air-jet cooling by the cooling means 9 is restricted to a minimum extent that the coating is not given scars by the transportation rolls 11, and immediately thereafter the fore end of the pipe is cut and the rear end thereof is also cut by the cutter 12 to a predetermined length as shown in FIG. 2. The pipe thus cut is cooled down to an ordinary temperature, meanwhile the coating can be shrunk to release the internal strain.

It is therefore an object of the invention to overcome the difficulties encountered in the conventional method for manufacturing a thermoplastic-resin-coated metallic pipe.

It is another object of the invention to provide a method and apparatus for providng such metallic pipe having little residual strain in the coating.

According to this invention there is provided (1) a method for manufacturing a metallic tube coated with a thermoplastic resin film having little residual strain wherein the outer surface of the metallic tube is continuously coated with a thermoplastic resin, which comprises cutting the coated tube under the condition that the temperature of the outer surface of the coated tube is kept as high as possible but below the softening point of the resin, and thereafter cooling the same down to an ordinary temperature, (2) a method according to the above (1) wherein the cooling after cutting of the coated tube is effected such that said tube is cooled from the middle toward the ends in order in its longitudinal direction, (3) an apparatus for manufacturing a metallic tube with a thermoplastic resin film having little residual strain by continuously coating the outer surface of said tube with said resin in arrangements including a cleaning step and a said-resin-coating step which comprises providing a forced shrinking step for forcibly cooling the coated tube cut to length so as to rapidly release the internal strain in the coating, said forced step being positioned sequentially to said coating step, (4) an apparatus according to the above (3) wherein a pipe-end trimming step is positioned sequentially to said forced shrinking step, and a threading step is positioned in the rear of said trimming step, (5) an apparatus according to the above (3) wherein said forced shrinking step comprises means to bring the temperature of the outer surface of the coated tube slightly below the softening point of said coating, means to cut the coated pipe to a predetermined length and means to forcibly cooling said coated tube cut to length from the middle to the ends in order in its longitudinal direction, said three means being positioned sequentially in order, (6) an apparatus according to the above (5) wherein said cooling means is positioned in a transporting means, said transporting means passing the coated tube in the direction perpendicular to the axis of the tube, and (7) an apparatus according to the above (6) wherein a plurality of cooling nozzles for the cooling means are arranged in the direction of passing the tube, said cooling nozzles being longer in size continuously or stepwise in the direction of passing of the pipe.

The temperatures of the surface of the steel pipe corresponding to the respective steps in this invention are shown in FIG. 2. The pipe is preheated at a preheating means 2 to between 30° C and 120° C. This temperature can be choosed depending upon the characteristics of the undercoating agent used. In one example, the preheating temperature is 100° C and a heat-melt type undercoating agent is applied under molten condition of 150° C to 180° C, whereby a slight increase of temperature occurs. At 4, the first layer is coated. The optimum temperature varies with the resin used. In case of a low density polyethylene used, the coating is effected at 170° C to 200° C. Immediately after the coating is over, the pipe is cooled to a temperature at which the coating is not given scars by pinch rolls, roll gangs or other transportation means. The range of temperatures at which the coating is not injured by the transportation rolls is determined depending upon the softening temperature of a resin used. For example, the softening temperature of the low density polyethylene is 80° C to 100° C, that of the high density polyethylene is 100° C to 130° C and that of polypropylene is 140° C to 150° C. It is thus necessary to cool the pipe slightly below that temperature. Than a melt-adhesion preventing agent is melted and applied at about 150° C, so that a slight increase of temperature occurs.

The temperature of the outer surface of the material is further increased by applying the second layer thereto. It varies with a resin used, which may be 170° C to 200° C for the low density polyethylene, 200° C to 250° C for the high density polyethylene and also 200° C to 250° C for polypropylene. The optimum extrusion temperature may be choosed depending upon the capacity of an extrusion machine used or the grade of a resin used. After the second, protection layer is coated, the pipe is cooled to the range of temperatures at which the coating is not injured even if the coating comes into contact with a transportation means. This range of temperatures varies with the kind and grade of a resin used. For example, it is 80° C to 100° C for the low density polyethylene, 110° C to 130° C for the high density polyethylene and 140° C to 150° C for polypropylene. The pipe is thus cooled down to or below this range. However, as set forth above, the remaining of the internal strain is lesser as the resin used is kept at as high a temperature as possible below the softening temperature of the resin until the coated pipe is cut to a predetermined length. Accordingly, the cooling of the coated pipe is effected at minimum so long as it reaches the range of temperatures as which substantially no scar is imparted to the coating, and after it is cut to a predetermined length, it is cooled down to an ordinary temperature.

EXAMPLE 1

A carbon steel pipe is to be used for 80A × 5500α piping is used as a material. This carbon steel pipe is coated under the conditions as follows:

Undercoating: 0.3
First layer coating: 0.5 mm of low density polyethylene
Melt-adhesion preventing agent: 0.1 mm
Second layer coating: 1.0 mm of high density polyethylene
Drop ratio: 2.3 for first layer coating and 1.8 for second layer coating The conditions of cooling and shrinking are shown below:

| Cooling step | Standing for two days after manufacture | Heat cycle test |
|---|---|---|
| Conventional method | 6 mm | 23 mm |
| Method of this invention | 1 mm | 4 mm |

As shown in the above table, in the conventional method, a shrinkage of the coating of 23 mm occurs in the heat cycle test. Thus the pipe is allowed to stand for 2 days after manufacture, whereby a shrinkage of 6 mm occurs. Thereafter the ends of the pipe are subjected to a trimming operation and the pipe is shipped out as a product. There is a possibility of further shrinkage depending upon the subsequent temperature cycle. In this invention, however, the coating shows only 4 mm shrinkage in the heat cycle test because it is subjected to a substantial shrinkage in the course of manufacture. Thus there is no necessity to stand the pipe in a storage space. It can be immediately subjected to a trimming operation to trim the coating at the pipe ends and shipped out as a product, since there is hardly any possibility of further shrinkage of the coating. Therefore, there is no need of providing a storage space, and the coating operation and the trimming operation can be effected continuously, which exerts great effect in enhancement of productivity.

Figure 6:
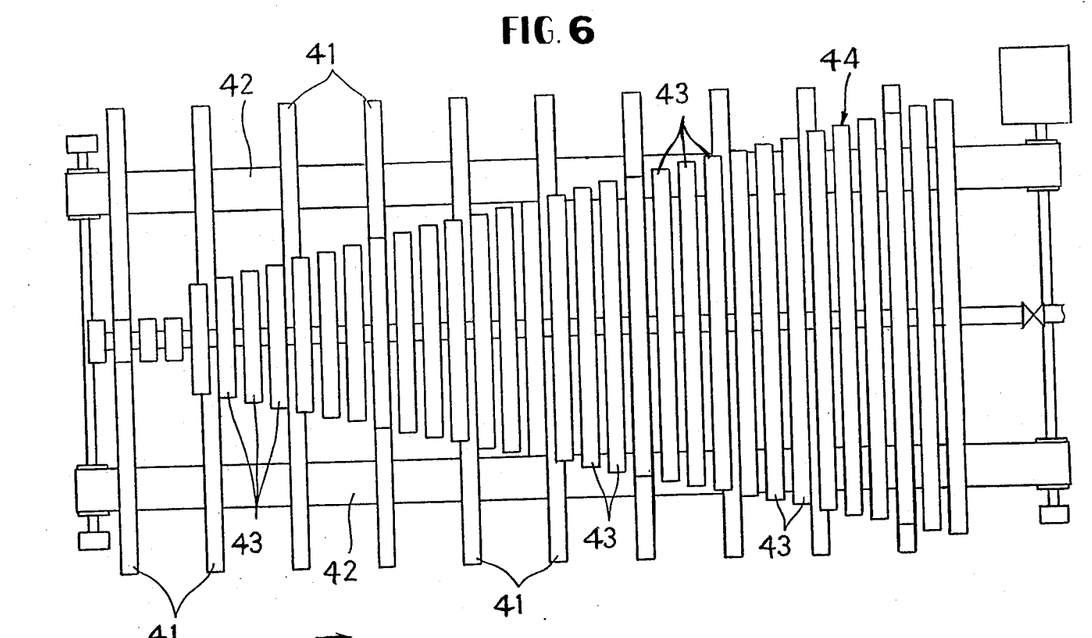
FIGS. 6 to 8 are schematic views showing improved means for cooling according to this invention.
Figure 7:
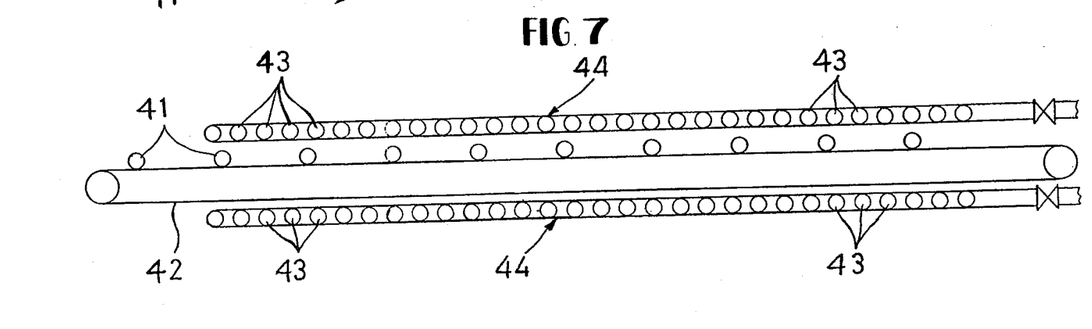

In order to overcome the above mentioned defects of the conventional method, this invention provides another effective method of cooling, which is explained hereinafter with reference to other embodiments shown in FIGS. 6 to 8.

As in the conventional case, a number of metallic pipes such as steel pipes are connected by connecting means. The pipe thus connected is allowed to travel in the axial direction through a preheating means. The preheated pipe is painted with an undercoating agent such as adhesive or bonding agent. Thereafter, a cylindrical, semi-molten plastic which is extruded continuously from a round die of an extrusion machine is coated continuously on the undercoated surface of the pipe.

When the external temperature of the plastic-coated pipe is lowered slightly below the softening temperature of the plastic, the pipe is cut to a predetermined length. Then as shown in FIGS. 6 and 7, the pipe 41 thus cut is put on a pair of conveyors 42 positioned in parallel by a certain distance and conveyed in a direction of the arrow shown. By a cooling means 44 which consists of a plurality of spray pipes 43 arranged symmetrically, the pipe 41 is cooled from the center to the ends in its longitudinal direction, since said spray pipes have continuously longer lengths in the direction of arrow as shown.

When the cooling is effected in this manner, the middle part of the pipe is first cooled under the condition that the undercoating agent on the pipe 41 is kept at a high temperature or that the undercoating agent has weak adhesive power or small restricting power. Accordingly, the plastic coating in the middle part is shrunk and simultaneously the coating in both sides of the cooled part which has not been cooled yet is readily drawn toward the cooled, shrunk part. This way of cooling and the phenomenon of drawing the coating thereby move gradually toward the ends of the pipe. As a result, the coating can be cooled and shrunk quite effectively, while a substantial tensile stress can be prevented from remaining in the coating.

Figure 8:
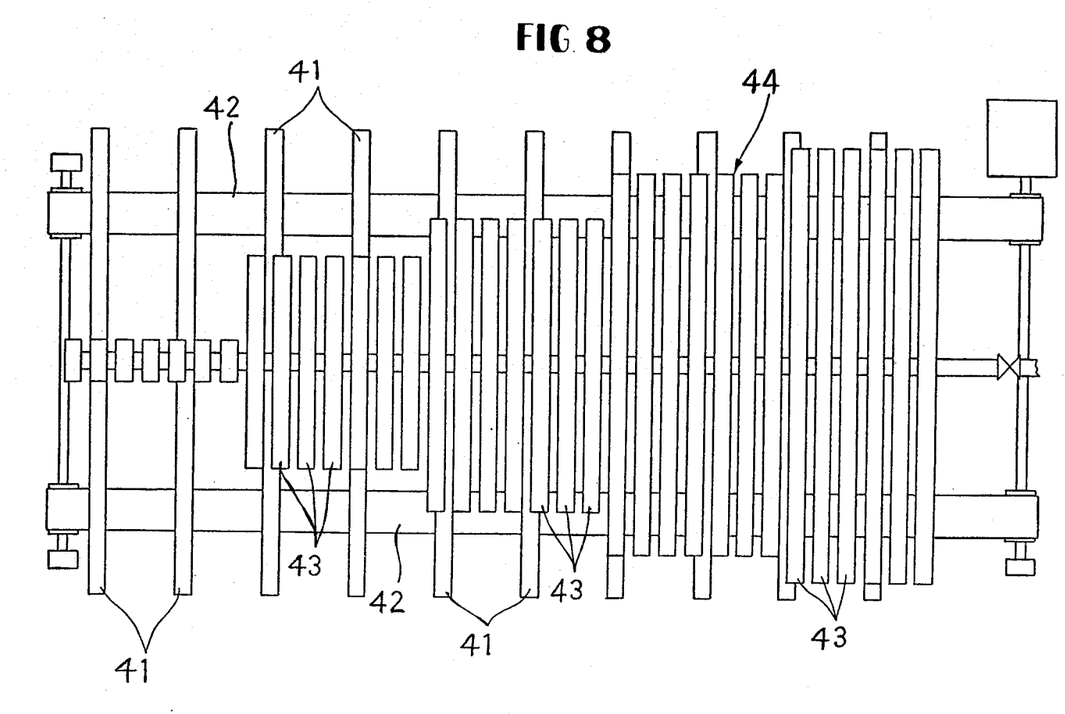

FIG. 8 shows another example of the cooling part, from which it is seen that a plurality of nozzles or spray pipes 43 having longer length stepwise in the direction of movement of the pipe 41 on a pair of conveyors 42.

As set forth above, a semi-molten plastic in a cylindrical form is continuously coated on the external surface of a metallic pipe. When the outside temperature of the coated pipe is lowered slightly below the softening temperature of the plastic, the coated pipe is cut to a predetermined length and the pipe thus cut is cooled from the middle to the ends along its longitudinal direction. Thus under the condition that the undercoating agent is kept at a high temperature or that the undercoating agent has weak adhesive power or small restricting power, the middle part of the coated pipe is first cooled whereby the plastic at that position is shrunk, while the plastic coating existing on both sides thereof is drawn readily toward that cooled and shrunk part. This way of cooling and the phenomenon of drawing the coating move gradually toward the ends of the pipe. Accordingly, the cooling is effected at a high efficiency, while preventing a large tensile stress from remaining in the plastic, and a shrinkage of the coating after manufacture of the coated pipe can be made extremely small.

Another embodiment of this invention is described with reference to FIG. 5.

In this example, the steps from cleaning 22 to extrusions 27, 27' are similar to those of the conventional case, but a forced shrinking step 34 is provided before a pipe-end trimming step. Consequently a storage space 33 which has been required in the conventional process as an off-line step becomes unnecessary, whereby the coating step and the trimming step are directly connected, all being on line. Moreover, a threading machine 21 which has been positioned in a start line in the conventional method is positioned directly after the trimming machine 30.

In order to make it possible to connect the trimming step directly with the coating step without necessity of providing the storage space 33, it is necessary to overcome the trouble that the ends of the pipe are gradually exposed due to shrinkage of the coating after the product is cut to length. This purpose can be accomplished by allowing the coating to be shrunk fully before the trimming operation.

In order to fully shrink the coating, a step for forcibly shrink the coating before the trimming operation is provided in a line. There are various methods to forcibly shrink the coating within a line for manufacturing a coated metallic pipe, one of which is described as follows:

The shrinkage of the resin coating takes place in the course of cooling from a high temperature to an ordinary temperature. It has now been found that the shrinkage occurs particularly remarkably at or near the free end at which the coating has been cut due to the influence of the adhesive power or frictional resistance, etc. between the coating and the external surface of the metallic pipe.

Figure 5:
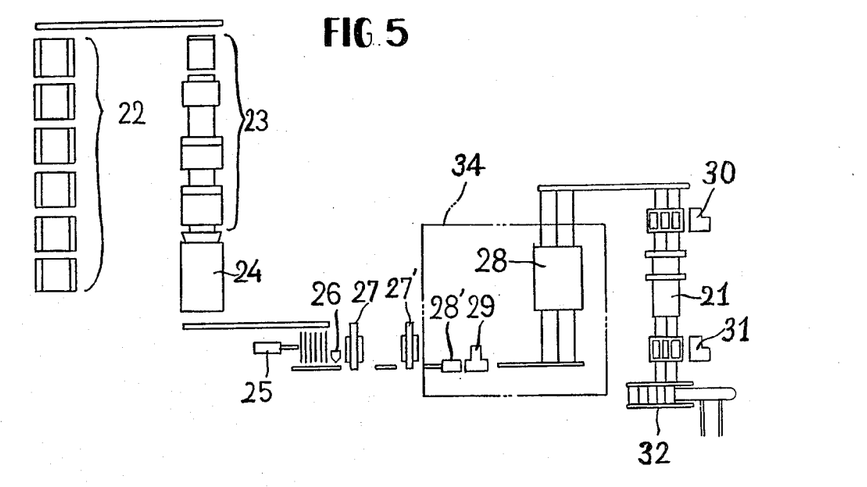
FIG. 5 is a schematic view showing another example for manufacturing a resin coated pipe according to the method of this invention.

In FIG. 5, the pipe is coated by an extrusion machine 27 or 27' and then in a forced shrinking step 34, it is first subjected to an intermediate cooling by an intermediate cooling device 28' to the range of temperatures such as 80° C to 110° C at which the coating is not substantially given scars by transportation rolls. Immediately after that, the fore end and the rear end of the pipes are cut in order by means of a flying shear 29.

The fore and the rear ends of the coating on the pipe cut to a predetermined length are freely released so that the shrinkage of the coating proceeds very rapidly. Then the pipe is cooled down to an ordinary temperature by means of a cooling device 28. Also in the course of this cooling, the coating is shrunk to thereby release the internal strain.

In order to keep both ends of the coating freely released as above, it is preferable that the outer surface of the metallic pipe is flat and it is thus more advantageous to place in rear of the line a step for processing such part as a screw which prohibits shrinkage of the coating.

By providing such forced shrinking step 34 as mentioned above between the coating step and the trimming step, it becomes possible to connect the trimming step directly with the coating step on line, whereby the operation steps can prominently be shortened.

For example, in the conventional method, the pipe manufactured is allowed to stand for 10 days to give shrinkage of coating of 12 mm. On the contrary, in the method of this invention, the coating of the pipe shrinks by 21 mm within a line, and thus there is no need of providing a storage space as off-line for shrinkage of the coating.

Accordingly, the period for manufacture which is usually several days in the prior art can be contracted to only 10 minutes or so according to this invention.

The reason why the threading step can be placed in the rear of the whole process is as follows:

The threading or screw-making operation has not heretofore been conducted after the resinis coated on the pipe. It is because it has so far been considered as disadvantageous to restrict the pipe over the coating when the threading operation is effected, since the shear adhesive power of the coating to the surface of the metallic pipe is insufficient. However, the cutting torque for threading is said to be 10000 ft-lb at maximum, and even in the case of a metallic pipe of 80A, the shear strength standing thereto is about 12.1 kg/cm$^2$. Thus if the resin coating can be restricted to the outer surface of the metallic pipe by a shear strength of 12.1 kg/cm$^2$ or so, the threading operation can be done after the resin coating has been formed.

If an undercoating agent of a hot-melt type consisting of 40% to 70% of a copolymer of ethylene-vinyl acetate and 60% to 30% of Tatsuki fire, to which 0 to 30% of Bron asphalt has been added, is used, a necessary shear adhesive power can be obtained and thus a threading operation can be done after coating, whereby a screw-making or threading machine can be positioned sequentially in the rear end of the proces.

As a result, a metallic pipe is passed through a cleaning step, an inside-surface-painting step, a baking and drying and a resin coating step in order, and a coated metallic pipe is thus obtained. Then this coated pipe is passed via a high-temperature-cutting step directly to a pipe-end-trimming step, or via said cutting step directly to a threading step without passing through said trimming step, where it is threaded as coated, a socket or cap is fixed to both ends of the pipe, and packed for shipment.

In this example, a metallic pipe is coated with the resin at the resin coating step, and the coated pipe is passed to the forced shrinking step so as to forcibly shrink the coating and release the internal strain of the coating rapidly. Consequently, the time required from the coating step to the trimming step can be remarkably shortened so that the coated metallic pipe can be manufactured in high efficiency. In addition, a storage house or space becomes unnecessary and thus labors and expenses in the transportation operation for such storage can be saved. Furthermore, by placing the threading operation after the coating operation, there is no fear of damage or stain of the threaded part of the pipe. Moreover, the coating can be forcibly shrunk readily and rapidly, since it does not happen in the forced shrinking step that the shrinkage of the coating is hindered by the threaded part of the pipe.

We claim:

1. In apparatus for manufacturing a metallic tube coated with a thermoplastic resin film having little residual strain comprising a cleaning means for cleaning said metallic tube, a coating means for coating the so cleaned metallic tube with thermoplastic resin, a cutting means for cutting the so coated metallic tube to lengths and a forced shrinking means for forcibly cooling the cut metallic tube, the improvement wherein each of said means is positioned successive to one another with said cleaning means upstream of said coating means which in turn is upstream of said cutting means which in turn is upstream of said forced shrinking means, said forced shrinking means comprising transporting means for transporting said cut lengths of tube in a direction perpendicular to its axis and successive cooling means which initially cool said tube in the center thereof and successively cool regions of said tube towards the ends thereof.

2. An apparatus according to claim 1 wherein said forced shrinking means comprises a set of conduits transversely of the path of movement of the cut tube, which conduits emit a cooling spray, the length of said successive conduits in increasing in the direction of path of travel of said cut tube.

3. An apparatus according to claim 2 wherein the length of successive conduits increases stepwise in the direction of the path of travel of the cut pipe.

4. An apparatus according to claim 2 wherein the length of successive conduits increases continuously in the direction of the path of travel of said cut tube.

5. An apparatus according to claim 2 wherein said apparatus further comprises a tube end trimming means and a tube threading means successively downstream of said forced shrinking means.

6. An apparatus according to claim 2 wherein said forced shrinking means comprises a second cooling means for bringing the temperature of the outer surface of the coated tube slightly below the softening point of said coating.

* * * * *